United States Patent
Turner et al.

[11] Patent Number: 5,772,747
[45] Date of Patent: Jun. 30, 1998

[54] TIRE SEALANT COMPOSITION

[75] Inventors: Ronald L. Turner, Golden; John A. Elverum, Westminster, both of Colo.

[73] Assignee: Peter Chun, Littleton, Colo.

[21] Appl. No.: 747,996

[22] Filed: Nov. 12, 1996

Related U.S. Application Data

[63] Continuation of Ser. No. 283,839, Aug. 1, 1994, abandoned.

[51] Int. Cl.⁶ ..................................................... C09K 3/12
[52] U.S. Cl. ................. 106/33; 106/163.01; 106/205.01; 106/287.17; 106/287.26; 106/415; 523/166; 141/38; 156/95; 156/97; 156/115
[58] Field of Search ................. 106/33, 205.01, 106/287.17, 287.26, 163.01, 415; 523/166; 152/450, 415, 503, 504; 141/5, 38; 222/4; 156/97, 95, 115

[56] References Cited

U.S. PATENT DOCUMENTS

| | | | |
|---|---|---|---|
| 2,286,963 | 6/1942 | Houser et al. | 106/33 |
| 3,352,696 | 11/1967 | Wallace | 106/343 |
| 3,850,217 | 11/1974 | Edwards et al. | 152/158 |
| 3,881,943 | 5/1975 | Fuller et al. | 106/33 |
| 4,101,494 | 7/1978 | Kent et al. | |
| 4,149,579 | 4/1979 | Senger | 152/347 |
| 4,289,089 | 9/1981 | Tacke et al. | 156/115 |
| 4,501,825 | 2/1985 | Magyar et al. | 521/78 |
| 4,524,159 | 6/1985 | Barber | 106/33 |
| 4,713,114 | 12/1987 | Smith | 106/33 |
| 4,776,888 | 10/1988 | Morrow | 106/33 |
| 4,867,792 | 9/1989 | Ronlan | 106/33 |
| 5,226,958 | 7/1993 | Bowman et al. | 106/33 |
| 5,403,417 | 4/1995 | Dudley et al. | 156/97 |

*Primary Examiner*—Michael Marcheschi
*Attorney, Agent, or Firm*—John E. Reilly

[57] ABSTRACT

A sealant composition especially useful for stopping punctures in vehicle tires includes: (a) a viscous fluid such as propylene glycol or polypropylene glycol; (b) one or more fibrous materials such as cellulose, wool, nylon, rayon, hair, wollastonite, rock-wool, glass wool fibers, polyester, polypropylene, or other material of like nature; and (c) flat plate-like particles, such as mica. In one embodiment, the composition is too viscous to be readily passed through a pneumatic tire valve stem, so the viscous product is installed into the tire while the tire is dismounted from the wheel. In another embodiment, the composition is made of two parts, each of which is sufficiently low in viscosity to pass readily through the valve stem, but which react on mixing inside the tire form a liquid of higher viscosity.

11 Claims, No Drawings

TIRE SEALANT COMPOSITION

This application is a continuation of Ser. No. 08/283,839, filed 1 Aug., 1994, for TIRE SEALANT COMPOSITIONS, invented by R. L. Turner and J. A. Elverum Abn.

BACKGROUND OF THE INVENTION

1. Field of the Invention

The present invention relates to tire sealant compositions, and more particularly pertains to improved tire sealant compositions adapted for long term use in vehicle tires to substantially and immediately seal accidental punctures and thus prevent flat tires, accidents caused by steering control resulting from tire failures, and the time and expense associated with conventional methods of tire repair.

2. Description of the Prior Art

The prior art has proposed various sealant materials for sealing tires. Most of these are intended as an emergency measure, to be injected into the tire through the valve stem after a puncture occurs, and do not remain active for extended periods of time after placement in the tire. Known compositions include water-based latexes, which are effective for only a short time, because they dry by evaporation and coagulation, leaving a rubbery mass. Another known type of tire sealant employs a solution of sodium silicate or similar materials which dry to form a sealing plug. Solutions of dextrin and similar organic gums have also been used. All of these compositions have the shortcoming that they dry after a relatively short period of time, and therefore can not be used for permanent or long-term protection from punctures, but rather are normally applied after a puncture occurs.

One known type of sealant which has been used for long-term protection includes an ethylene glycol carrier liquid with suspended fibers of glass and nylon. This type of sealant has several drawbacks:

1. Ethylene glycol is poisonous and has a sweet taste, the combination of which makes the material very dangerous for consumer applications.
2. Ethylene glycol has a freezing point of −13° C., and a boiling point of 198° C. The viscosity of ethylene glycol varies greatly between −5° C. and 25° C. Because the temperature of a vehicle tire in use may vary from below −29° C. to above 50° C., the practical effective temperature range of sealant mixtures based on ethylene glycol is limited.
3. Glass fibers, if accidentally splashed into the eye, are very difficult to remove, and can quickly cause permanent serious eye damage.
4. Compositions of this nature dry on standing and become more viscous, thus decreasing their effectiveness over time after placement in a tire.
5. Although some formulations seal well against air loss, they tend to continue to ooze liquid through the repair plug formed by the fibers, thus allowing the liquid to eventually leak from the tire. When this happens, the sealant is no longer effective in case of a new puncture.

U.S. Pat. No. 5,266,958, issued on Jul. 13, 1993, discloses a sealant composition employing ethylene glycol, fibers, swollen soft deformable particles such as cross-linked carboxymethyl cellulose, and extremely fine particles such as silica aerogel particles. In theory, after puncture, the soft particles conform around the fibers to form a low porosity plug by blocking interstitial regions between the fibers.

U.S. Pat. No. 4,713,114, issued on Dec. 15, 1987, discloses a sealant composition including ethylene glycol, mica, and short and long asbestos fibers. In addition to the aforementioned drawbacks associated with the use of ethylene glycol as a carrier, asbestos fibers constitute a known carcinogen.

SUMMARY OF THE INVENTION

A sealant composition especially useful for stopping air loss through accidental punctures in pneumatic rubber vehicle tires comprises: (a) a viscous carrier fluid such as propylene glycol, polyethylene glycol, or polypropylene glycol; (b) one or more fibrous materials such as cellulose, wool, nylon, rayon, hair, wollastonite, rock-wool, glass wool fibers, polyester, and polypropylene, or other material of like nature; and (c) flat platelets or plate-like particles, such as mica.

A useful analogy to help understand the functioning of the invention is a log-jam in a creek. If limbs are placed across the flow of water, some slowing will take place. If smaller and smaller twigs are added, these may almost completely block the flow of water through the creek. The addition of leaves and other flat matter to the structure of sticks and twigs form an overlayment which can completely block the water flow.

In the present invention, the sealant blocks leakage of air through inadvertent punctures in tires by immediately filling the hole in the tire with a suspension of the fibrous material in the viscous carrier medium. The viscosity of the carrier liquid prevents it from passing out of the tire through the net or "log-jam" of fibers, thus preventing air from escaping through the puncture.

In one embodiment, the sealant composition is too viscous to be readily passed through a tire valve stem, so the viscous product is installed into the tire while the tire is dismounted from the wheel.

In another embodiment, the sealant composition is made of two parts, each of which is sufficiently low in viscosity to pass readily through a tire valve stem, but which react on mixing inside the tire to form a liquid composition of higher viscosity.

Another aspect of the invention contemplates the addition to the sealant composition of flat platelets or plate-like particles, such as mica. Using the log-jam analogy, these plates behave like leaves, forming an overlayment which seals against even a small amount of leakage of the liquid carrier medium. Satisfactory sealants according to the present invention can be made without the use of the flat plate-like particles, but there is generally some leakage of suspending carrier liquid if these platelets are omitted.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT(S)

An improved tire sealant composition according to the present invention includes a suspension of fibers and platelets in a viscous carrier liquid medium. Various additives may be employed to modify the viscosity, reduce corrosion potential, prevent fungal and bacterial growth, and the like. Other additives, such as coloring agents for more attractive and marketable appearance, bittering agents to prevent inadvertent ingestion of the product, and fragrances to present a more pleasing odor of the product during installation, are optional and have no practical effect on the functioning of the composition as a sealant. Tests reveal that propylene glycol is a satisfactory suspending and sealing medium, but that a better viscosity/temperature range may be obtained by using certain polyglycols in the carrier liquid. In particular, P1200, a polypropylene glycol available from the Dow Chemical Co., Midland, Mich., provides a useful viscosity through a wide temperature range. Mixtures of commercially available polyglycols also function well in this application. Propylene glycol and the polyglycols are not toxic, and are therefore safer than ethylene glycol which is used in some sealants. Liquids usable in the formulation of the carrier fluid in sealing compositions according to the present invention include water, polypropylene glycol, polybutylene glycols, propylene glycol, and ethylene glycol polyols.

Sealants pursuant to the instant invention preferably employ fibers of a variety of different lengths suspended in the carrier liquid. Referring to the log-jam analogy, if all the logs are the same length, there will not be as effective a flow reduction as if some strong, long fibers (long logs) are present to form a strong structure, followed by some smaller fibers (branches) to bridge the gaps, followed by very small fibers (small sticks) to form a network effective in stopping liquid flow. Platelets such as mica act as leaves in the log-jam to form an overlayment effective to completely stop all liquid flow. If liquid can not escape, air is effectively retained indefinitely.

Suitable fibers include cellulose, wool, flax, sisal, nylon, rayon, hair, wollastonite, rock-wool, glass-wool, cotton, polyester, and polypropylene.

The preferred platelet material is mica, although other plate-like minerals, organic materials, or metal flakes (such as aluminum pigment powder, which is commonly available in a flake- or plate-like form), will also function in the mixture to seal tiny gaps in the log-jam structure.

If the proportional content of fibrous materials in the sealant composition is too high, the viscous mixture does not distribute well or quickly over the inside surface of a rotating tire to always quickly seal an inadvertent puncture. Conversely, if the mixture contains too much liquid, there is insufficient sealing effect to block the flow of liquid, and the sealant will not be effective. Preferably, the proportion of fibers should be in the range of 2% to 6% by weight. This proportion varies depending on the inherent viscosity of the liquid medium and on the particle dimensions of the suspended fibers. In the context of the instant disclosure, all percentage proportions are given on a by weight basis, rather than on a volumetric basis, unless otherwise specifically indicated.

Ethylene glycol as well as some other carrier liquid media have a tendency to absorb and hold water, potentially leading to corrosion of steel vehicle wheels. Antioxidant or anticorrosion additives may be employed to inhibit such corrosion. For example, the addition of 2% of MONACOR TEH, a proprietary organic amine phosphate of Mona Industries, Inc. of Paterson, N.J., or 1% of triethanolamine, can eliminate the tendency of the sealant to increase corrosion of steel wheels. In addition to the above-listed corrosion preventives, other anticorrosion materials may likewise be employed to accomplish the same objective.

Fungus and other biota may grow in various carrier liquid media, and may lead to degradation of the sealant composition. To prevent such growth, it may be desirable to include an antifungal or bacteriostat compound to the product. Tests reveal that 0.09% of Dowicide I or 0.02% of DOWICIL 75 is effective in stopping the growth of biota in sealant compositions pursuant to the present invention. DOWICIL 75 is a preservative containing 1-(3-chloroallyl)-3,5,7-triaza-1-azoniaadamantane chloride as the active ingredient, and is available from the Dow Chemical Co. of Midland, Mich. Other biocides may also be employed to accomplish the same objective.

Colorants such as FD & C blue #1, Orasol Blue, Emerald Green Shade #5525, and Polyester Blue (GLF) may be employed depending on the desired color of the sealant composition, in amounts ranging from 0.01–0.6% solid, 0–2.0% liquid.

Various additives for pH adjustment, mildewcides, and dispersants may be employed such as MONACOR TEH, DOWICIDE I (Orthophenyl Phenol), Triethanolamine, PHOSPHOTERIC T-C6, TWEEN 20, DOWFAX 8390, MONATERIC LFNA50, SURFYNOL 104N, TAMOL 731, ACRYSOL LMW, Liquid Lecithin, and PHOTONOL AS-5576 in amounts ranging from 0.1–10.0%.

Thickeners such as CARBOPOL ETD2020, CARBOPOL 1621, and CAB-O-SIL M-5 may be added at about 0.03% by weight. DISPAL Alumina, KELTROL, a food grade Xanthan Gum available from Kelco of Chicago, Ill., and other materials may also be employed as thickening agents.

Table No. 1 discloses specific formulations of two component sealant compositions in which Part A and Part B are introduced separately through a tire valve stem and subsequently mix within a tire. Upon mixing, the resulting formulation possesses a viscosity greater than the viscosity of either Part A and Part B.

TABLE NO. 1

TWO COMPONENT SEALANT SYSTEMS

| Ingredients | Two part system #1 | Two part system, #2 | Two part System, #3 | Two part System #4 |
|---|---|---|---|---|
| PART A | | | | |
| 1,2-Propanediol | 52.73% | 41.10% | 17.15% | 53.24% |
| Polyglycol P-1200 | | | 51.50% | |
| Cotton 525 | 0.96% | 0.90% | 1.72% | 0.97% |
| Sisal 310 | 0.29% | 0.90% | 0.43% | 0.24% |
| Mica 14WA | 0.96% | 0.90% | 1.72% | |
| DISPAL 23N4-20 | 14.38% | 16.00% | 8.58% | 14.52% |
| Blue Food Color, 2% Solution | | | 0.01% | 0.02% |

TABLE NO. 1-continued

TWO COMPONENT SEALANT SYSTEMS

| Ingredients | Two part system #1 | Two part system, #2 | Two part System, #3 | Two part System #4 |
|---|---|---|---|---|
| PART B | | | | |
| Polyglycol P-1200 | | 19.20% | 8.58% | |
| 1,2 Propanediol | 28.76% | 18.30% | 8.58% | 29.05% |
| Cotton 525 | 0.96% | 0.90% | 0.86% | 0.97% |
| Triethanolamine | 0.96% | | 0.86% | 0.97% |
| Sisal 310 | | | | |
| FD & C Blue Food Color, 2% solution | | | 0.01% | 0.02% |
| Sodium Chloride | | 1.80% | | |

A variety of different mechanisms may be employed for producing a viscosity increase upon mixing of two components of a tire sealant within a tire. For example, a viscosity increase can be achieved by altering the pH of the formulation. The two part composition #3 is thickened when Triethanolamine in Part B is added to Part A which contains DISPAL 23N4-20 alumina sol. The change in pH results in an increase in viscosity due to hydrogen bonding forming a colloidal suspension. Clays and silicas behave in similar fashion. A change in the ionic concentration can also change the viscosity. The addition of salts, such as sodium chloride or magnesium sulfate, can be used to thicken the alumina sol fiber mixture.

There are other materials which can be used to thicken the two part tire sealant formulations including clays, silicas, gums (Xanthan Gum, Guar Gum, Gum Arabic), alginate derivatives, cellulosic derivatives, and acrylic acid polymers (Carbopols). Several of these we have tested.

Xanthan Gum and probably the other gums can be introduced in one component which is essentially water-free, and the second component would contain x amount of water. It appears that as the Xanthan gum begins to dissolve in the water, it unwinds from structured "shape" such as a helix into a random coil with more effective hydrodynamic volume which increases the viscosity.

Likewise, the CARBOPOL polymers can be introduced in one component, preferably moisture-free. These polymers are tightly coiled, but can begin to uncoil when hydrated in water. When the polymer is neutralized with a base contained in the second component (such as Triethanolamine, Ammonia, Sodium Hydroxide, or Potassium Hydroxide), it uncoils completely, resulting in a marked viscosity increase in the mixture.

The change in viscosity is the result of the two parts interacting to form a colloid such as a gel or sol (colloidal solution). The dimension of the particles rather than their nature is important to the formation of the colloidal suspension. In this size range (1 nm to 1 micron) the surface area of the particle is so much greater than its volume that unusual phenomena occur; for example the particles do not settle out of suspension by gravity.

In testing the two part sealant system #1, Parts A and B were weighed and mixed separately. Each Part was tested separately to see if it would flow through a tire valve stem. Both Parts A and B flowed readily through the valve stem. Parts A and B were mixed together, let sit for 10 minutes, then the mixture was tested for flowability through a valve stem. The mixture did not flow through the valve stem, no fluid was lost through the valve stem for ½ hour.

The two part sealant system #4 was also tested. Parts A and B were weighed and mixed separately. Each Part was tested separately to see if it would flow through a tire valve stem. Both Parts A and B flowed readily through the valve stem. Parts A and B were mixed together, let sit for 10 minutes, then the mixture was tested for flowability through a valve stem. The mixture did not flow through the valve stem, no fluid was lost through the valve stem for ½ hour.

The present invention also contemplates tire sealant compositions which are premixed and thus have a viscosity high enough to preclude introduction through a tire valve stem. To install such a sealant, the tire is first demounted from the wheel, the sealant is introduced, and the tire remounted. Example premixed tire sealant compositions are described in Tables Nos. 2 and 3.

TABLE NO. 2

PREMIXED SEALANT COMPOSITIONS

| Ingredients | #5 | #6 | #7 | #8 |
|---|---|---|---|---|
| Polyglycol P-1200 | 90.89% | 94.84% | 89.28% | 88.15% |
| Sisal 250 | 1.01% | 0.69% | 0.60% | 0.98% |
| Cotton W260 | 2.04% | 1.26% | 1.19% | 1.96% |
| Nylon | 1.52% | 1.26% | 1.19% | 1.47% |
| PHOSPHOTERIC T-C6 | 2.52% | | 5.95% | 2.45% |
| Mica UGMM-25, or 14WA | 1.01% | 1.26% | 1.19% | 0.98% |
| CAB-O-SIL M-5 | 1.01% | | | 0.98% |
| TWEEN 20 | | 0.69% | 0.60% | |
| Kaolin | | | | 0.98% |
| MONACOR TEH | | | | 1.96% |
| DOWICIDE I, Orthophenyl Phenol | | | | 0.09% |

These ingredients were blended together and allowed to sit for about ½ hour. These compositions were tested in a hole-plugging experiment which used drilled test holes of 0.0400, 0.0625, 0.1250, and 0.1875 inch diameters in the base of separate plastic beakers. The tire sealant composition was placed in one of the beakers, and the beaker was then placed into a vacuum filtration adapter adjoining a filtering flask. This arrangement formed a tight seal between the base of the beaker and the flask. Vacuum was started, and the observation was made whether the tire sealant material plugged the hole.

If the material failed, the tire sealant would continue to leak or flow into the flask. When a material performed as intended, it would at some point plug the hole and prevent additional material from entering the flask from the base of the beaker.

Table no. 3 lists formulations for additional example premixed sealant compositions according to the invention.

TABLE NO. 3

PREMIXED SEALANT COMPOSITIONS

| Ingredients | #9 | #10 | #11 | #12 |
|---|---|---|---|---|
| 1,2 Propanediol | | | 57.13% | 25.73% |
| Polyglycol P-1200 | 83.04% | 90.70% | 34.29% | 60.04% |

TABLE NO. 3-continued
PREMIXED SEALANT COMPOSITIONS

| Ingredients | #9 | #10 | #11 | #12 |
|---|---|---|---|---|
| Sisal 250 | 0.92% | | 0.57% | |
| Cotton W260 | 1.85% | 2.0% | 3.43% | |
| Nylon 572 | 1.39% | 2.0% | | |
| PHOSPHOTERIC T-C6 | 2.31% | 0.1% | | |
| Mica, 14WA | 0.92% | 1.0% | 2.29% | 1.72% |
| CAB-O-SIL M5 | 0.92% | 2.0% | | |
| Kaolin | 0.92% | | | |
| MONACOR TEH | 1.85% | 2.0% | | |
| DOWICIDE I | 0.08% | 0.1% | | |
| Triethanolamine | 0.01% | | | 0.86% |
| 1,2 Propanediol | 4.48% | | | |
| Water | 1.28% | | | |
| Orasol Blue 2GLN | | 0.1% | | |
| DISPAL 23N4-20 | | | | 8.58% |
| FD & C BLue #1 2% blue solution | | | | 0.07% |
| Sisal 310 | | | | 0.43% |
| Cotton 525 | | | | 2.57% |
| ALPHACEL PB 25 | | | 2.29% | |

Composition #10 was tested on the previously described vacuum test apparatus through a 0.125 inch diameter hole, under low to moderate vacuum conditions (water aspirator), material plugs the hole with no fluid loss, under high vacuum material leaks through the hole.

Composition #12 settles after prolonged standing. Composition #4 has not settled after standing several months. All of the formulations can be placed directly into the tire before it is sealed on the wheel rim. The two part systems were intended to be introduced into a mounted tire via the valve stem.

Substantially identical tire sealant compositions may be employed as either premixed or two component systems. For example, very similar sealants can be presented as a premixed composition, #12, and a two component system #3. This preferred composition has several distinctions relative to U.S. Pat. No. 4,713,114 and U.S. Pat. No. 5,226,958. The preferred sealant compositions include fibers of several lengths (long-Sisal 310, about 1/16" (0.0625") in length, cotton fibers about 0.03" in length, and flat Mica platelets about 0.0015" in length (39 microns). Upon puncture of a tire equipped with the inventive sealant, the long fibers initially bridge the hole, the smaller fibers become enmeshed between the longer fibers, and the platelets fill in the gaps between the fibers.

A combination of non-hazardous poly/propylene glycols help to give the liquid phase of the tire sealant a wider functional temperature range during actual use conditions. Ethylene glycol becomes solid at 8° F., whereas the poly/propylene glycol mixture should remain fluid below −40° F.

Generally, the example sealant formulations set forth in Tables 1–3 were prepared by slowly adding the fibers into the liquids until they were uniformly distributed. The colorants and Triethanolamine are added last.

Generic descriptions and example suppliers for the various chemicals and other materials employed in the tire sealant compositions pursuant to the present invention are listed in the following table.

TABLE NO. 4
CHEMICAL SUPPLIERS

| Ingredients | Manufacturer/Distributor |
|---|---|
| 1,2 Propanediol | J. T. Baker distributed by VWR Also known as Propylene Glycol |
| Polyglycol P-1200 | Dow Chemical Company Midland, MI 48674 polypropylene glycol with a molecular weight range of about 1200. |
| Cotton 525, Nylon 572 | Claremont Flock Corporation 169 Main St. Claremont, NH 03743 Cotton 525 is a white cotton fiber randomly cut to a length of about 0.013". Nylon 572 is randomly cut to a length of about 0.015". |
| Sisal 250, 310 Cotton W260 | International Filler Corporation P.O. Box 50 North Tonawanda, NY 14120 Sisal 250 is a sisal fiber cut to a length of about 0.25". Sisal 310 is cut to about 0.0625". The cotton W260 fibers are about 0.02–0.04" in length. |
| Mica 14WA, UGMM-25 | The Mearl Corporation Franklin Mineral Products Div. Highway 172 South Hartwell, GA 30643 Harcowhite 14WA is a wet ground mica product with an average particle size of 39 microns, the UGMM-25 is a dry ground mica with an average particle size of 25 microns. |
| DISPAL 23N4-20 | Vista Chemical Co. P.O. Box 19029 Houston, TX 77224 Dispal 23NA-20 is a synthetic aluminum oxide dispersion in water. |
| FD&C Blue Food Color #1 | Warner-Jenkinson Company, Inc. 2526 Baldwin St. St. Louis, MO 63106 FD&C Blue #1 is a water soluble blue color additive. |
| Triethanolamine | Van Waters & Rogers |
| CAB-O-SIL M-5 | Cabot Corporation Tuscola, IL 61953 Cab-O-Sil M-5 is a synthetic, amorphous, colloidal Silicon Dioxide. |
| TWEEN 20 | J. T. Baker distributed by VWR Tween 20 is polyoxyethylene (20) sorbitan monolaurate. |
| Kaolin | J. M. Huber Corporation Macon, GA 32198 |
| PHOSPHOTERIC T-C6, MONACOR TEH | Mona Industries, Inc. 76 East 24th St. P.O. Box 425 Patterson, NJ 07544 Phosphoteric T-C6 is a substituted carboxylated Cocoimidazoline Phosphate, Monacor TEH is an alkyl Amine Phosphate. |
| DOWICIDE I | Dow Chemical Company Midland, MI 48674 Dowicide I is ortho-phenyl phenol |
| CARBOPOL 1621 | The BF Goodrich Company Brecksville, OH 44141 Carbopol 1621 is an acrylic acid, copolymer, carboxy |

TABLE NO. 4-continued

CHEMICAL SUPPLIERS

| Ingredients | Manufacturer/Distributor |
|---|---|
| | polymethylene. |
| ORASOL BLUE 2GLN | CIBA-GEIGY Corporation<br>Newport, DE 19804<br>Orasol Blue 2GLN is a solvent<br>soluble copper phthalocyanine<br>derivative dye. |
| ALPHACEL PB 25 | International Filler Corporation<br>P.O. Box 50<br>North Tonawanda, NY 14120<br>Alphacel PB 25 is mechanically<br>processed cellulosic fiber with<br>a mesh size of about 30–50%<br>passing through a 200 mesh<br>screen. |
| Sodium Chloride | Mallinckrodt Specialty Chemicals<br>Company<br>Paris, Kentucky 40361 |

It is to be understood, however, that even though numerous characteristics and advantages of the present invention have been set forth in the foregoing description, together with details of the structure and function of the invention, the disclosure is illustrative only, and changes may be made within the principles of the invention to the full extent indicated by the broad general meaning of the terms in which the appended claims are expressed and reasonable equivalents thereof.

What is claimed is:

1. A tire sealant composition comprising:
   at least two separate components each having a viscosity low enough to allow passage through a tire valve stem wherein said at least two separate components comprise any of the following (a)–(f):
   (a) a suspension of fibers and platelets in a viscous carrier medium, or
   (b) triethanolamine and an aluminum oxide in water, or
   (c) a water-free gum and water, or
   (d) a water-free polymer and water, or
   (e) an acrylic acid polymer and a base for neutralizing said polymer, or
   (f) a salt and an aqueous aluminum oxide dispersion.

2. A tire sealant composition according to claim 1 wherein said viscous carrier medium is selected from a group consisting of propylene glycol, polyethylene glycol, polypropylene glycol, and mixtures thereof.

3. A tire sealant composition according to claim 1 wherein said fibers comprise any one of cellulose, wool, flax, sisal, nylon, rayon, hair, wollanstonite, rock-wool, cotton, glass wool fibers, polyester or polypropylene.

4. The composition according to claim 1, wherein said platelet comprises mica.

5. The composition according to claim 1, wherein said fibers comprise 2% to 6% by weight of said tire sealant composition.

6. The composition according to claim 1, wherein said fibers are of different lengths and comprise lengths of about 0.0625 inches and about 0.03 inches.

7. The composition according to claim 2, wherein said platelet comprises particles having a maximum dimension of about 39 microns.

8. The composition according to claim 1, wherein said platelet comprises particles having a maximum dimension of about 39 microns.

9. A tire sealant system comprising:
   a carrier fluid comprising any of propylene glycol, polyethylene glycol, polypropylene glycol, or mixtures thereof;
   fibrous material in the range of 2% to 6% by weight comprising any of cellulose, natural wool, nylon, rayon, hair, wollastonite, rock-wool, cotton, flax, sisal, glass wool fibers, polyester, polypropylene, or mixtures thereof;
   said fibrous material are of different lengths and comprise lengths of about 0.0625 inches and about 0.03 inches; and
   platelet material comprising mica or aluminum pigment powder, said platelet material having a maximum dimension of about 39 microns.

10. A tire sealant composition comprising:
    at least two separate components each having a viscosity low enough to allow passage through a tire valve stem; and
    wherein upon mixing of said at least two separate components within a tire, the viscosity of the resulting mixture is increased to a value greater than either of the separate viscosities of said at least two separate components prior to mixing wherein said one of said at least two components includes triethanolamine and the other of said at least two components includes an aluminum oxide dispersion in water such that mixing of said at least two components results in an increase in viscosity due to hydrogen bonding.

11. A tire sealant system, comprising:
    at least two separate components each having a viscosity low enough to allow passage through a tire valve stem; and
    wherein upon mixing of said at least two separate components within a tire the viscosity of the resulting mixture is increased to a resultant viscosity greater than either of the separate viscosities of said at least two separate components prior to mixing wherein one of said at least two components includes a salt and the other of said at least two components includes an aluminum oxide dispersion in water such that mixing of said at least two components results in an increase in viscosity due to hydrogen bonding.

* * * * *